United States Patent
Christian

(10) Patent No.: US 11,254,421 B2
(45) Date of Patent: Feb. 22, 2022

(54) DEPLOYABLE AIRCRAFT FLOTATION SYSTEM

(71) Applicant: Delano Christian, Walnut Creek, CA (US)

(72) Inventor: Delano Christian, Walnut Creek, CA (US)

( * ) Notice: Subject to any disclaimer, the term of this patent is extended or adjusted under 35 U.S.C. 154(b) by 345 days.

(21) Appl. No.: 16/558,484

(22) Filed: Sep. 3, 2019

(65) Prior Publication Data

US 2020/0070963 A1 Mar. 5, 2020

Related U.S. Application Data

(60) Provisional application No. 62/726,645, filed on Sep. 4, 2018.

(51) Int. Cl.
| | |
|---|---|
| *B64C 25/30* | (2006.01) |
| *B64C 25/36* | (2006.01) |
| *B32B 7/08* | (2019.01) |
| *B32B 15/06* | (2006.01) |
| *B64D 25/00* | (2006.01) |

(52) U.S. Cl.
CPC ............... *B64C 25/30* (2013.01); *B32B 7/08* (2013.01); *B32B 15/06* (2013.01); *B64C 25/36* (2013.01); *B64D 25/00* (2013.01); *B32B 2605/18* (2013.01)

(58) Field of Classification Search
CPC .......... B64C 25/30; B64C 25/52; B64C 25/54
See application file for complete search history.

(56) References Cited

U.S. PATENT DOCUMENTS

| | | | | |
|---|---|---|---|---|
| 2,465,193 A | * | 3/1949 | Boyle | B64C 25/54 244/105 |
| 2,646,235 A | * | 7/1953 | Dawson, Sr. | B64C 35/00 244/105 |
| 3,387,802 A | * | 6/1968 | Cruz | B64C 25/52 244/102 R |
| 4,027,835 A | * | 6/1977 | Sachs | B64C 25/52 244/101 |
| 4,356,787 A | * | 11/1982 | Harley | B63B 1/20 114/292 |
| 4,544,116 A | * | 10/1985 | Shwayder | B64C 25/52 244/108 |
| 4,685,641 A | * | 8/1987 | Kirsch | B64C 25/52 244/105 |

(Continued)

FOREIGN PATENT DOCUMENTS

WO WO-9413531 A1 * 6/1994 ............. B64C 25/52

*Primary Examiner* — Brian M O'Hara
*Assistant Examiner* — Michael B. Kreiner
(74) *Attorney, Agent, or Firm* — Boudwin Intellectual Property; Daniel Boudwin

(57) ABSTRACT

A deployable aircraft flotation system. The deployable aircraft flotation system includes a pair of flotation members. The pair of flotation members are positioned on opposing sides of a bottom surface of an aircraft body. Each flotation member of the pair of flotation members has an inner layer that is made of a first buoyant material, an outer layer that is made of a second buoyant material, and a middle layer between the inner layer and the outer layer that is made of a rigid material. The flotation members can be moved from a stowed position, where they are stored in housings, to a deployed position, where they emerge and are positioned on the bottom of the plane.

16 Claims, 2 Drawing Sheets

(56) References Cited

U.S. PATENT DOCUMENTS

| | | | |
|---|---|---|---|
| 4,848,702 A * | 7/1989 | Riggins | B64C 25/54 244/105 |
| 5,358,201 A * | 10/1994 | Brown, Sr. | B64C 25/52 244/108 |
| 5,645,250 A * | 7/1997 | Gevers | B64D 27/00 244/101 |
| 5,765,778 A | 6/1998 | Otsuka | |
| 7,156,033 B2 | 1/2007 | Mears et al. | |
| 2005/0077426 A1 | 4/2005 | Simard | |
| 2011/0049294 A1 | 3/2011 | Morley et al. | |
| 2014/0252165 A1 | 9/2014 | Smith et al. | |

* cited by examiner

DEPLOYABLE AIRCRAFT FLOTATION SYSTEM

CROSS REFERENCE TO RELATED APPLICATIONS

This application claims the benefit of U.S. Provisional Application No. 62/726,645 filed on Sep. 4, 2018. The above identified patent application is herein incorporated by reference in its entirety to provide continuity of disclosure.

BACKGROUND OF THE INVENTION

The present invention relates to a deployable aircraft flotation system. More specifically, the present invention relates to a structural apparatus that is installed upon an aircraft to make the aircraft safer.

Air travel is a very common form of transportation. Every day, more than eight million people board airplanes to get from one destination to another. Whether they are traveling for work or to take a vacation, these individuals get onto airplanes for flights of various durations and destinations. These flights are routed over all types of terrain, including cities, mountains, lakes, oceans, rivers, deserts, forests and tundra.

Unfortunately, tragedies can occur in air travel. Whether due to operator error or mechanical or electrical malfunctions of the airplane, a significant amount of money is lost in addition to injuries that can be inflicted and lives that can be lost when airplanes crash. Though uncommon, these occurrences are discouraging for people who fly and can cause people to change their travel plans.

Therefore, there is a defined need amongst the known art for a system that will reduce the risk of death or injury in the event of a plane crash.

SUMMARY OF THE INVENTION

In view of the foregoing disadvantages inherent in the known types of aircraft safety devices now present in the prior art, the present invention provides a deployable aircraft flotation system wherein the same can be utilized for providing convenience for the user when providing additional support to an aircraft that is about to crash.

The present system comprises a pair of floatation members. The pair of floatation members are disposed on a pair of sides of a bottom of an aircraft body. Each flotation member of the pair of flotation members has an outer layer, an inner layer and a middle layer. The middle layer is disposed between the outer layer and the inner layer. The middle layer is composed of a rigid material. The inner layer is composed of a first buoyant material. The outer layer is composed of a second buoyant material. The pair of flotation members are movable from a stowed position to a deployed position. The stowed position is defined where each flotation member is disposed in a housing. The deployed position is defined where each flotation member is disposed outside of the housing.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
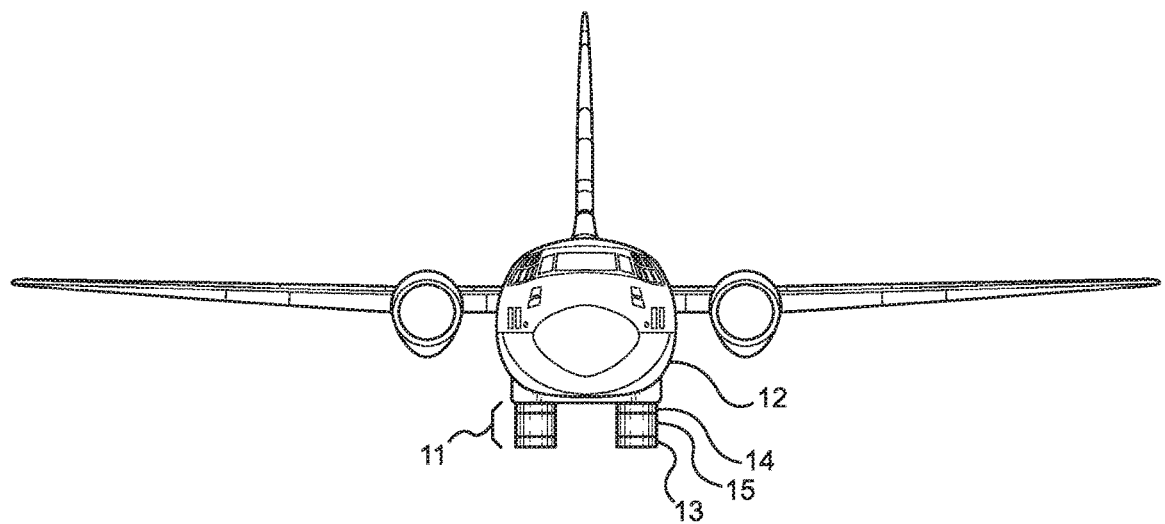
FIG. 1 shows a front elevation view of an embodiment of the deployable aircraft flotation system.

Reference is made herein to the attached drawings. Like reference numerals are used throughout the drawings to depict like or similar elements of the deployable aircraft floatation system. The figures are intended for representative purposes only and should not be considered to be limiting in any respect.

Referring now to FIG. 1, there is shown a front elevation view of an embodiment of the deployable aircraft flotation system. The deployable aircraft flotation system comprises a pair of flotation members 11. The pair of flotation members 11 is disposed on opposing sides of a bottom of an aircraft body 12. The pair of flotation members 11 are each planar and are symmetrically flat, such that the pair of flotation members 11 will each equally absorb an impact exerted thereon. If one of the flotation members of the pair of flotation members 11 is not flat like the other, then force will be unequally exerted upon the deployable aircraft flotation system, resulting in an uneven landing of the aircraft 12.

Each flotation member of the pair of flotation members 11 is identical in configuration. As such, there is no variance in the impact upon the pair of flotation members. Each flotation member of the pair of flotation members 11 comprises an outer layer 13 and an inner layer 14. A middle layer 15 is disposed in between the outer layer 13 and the inner layer 14. In one embodiment, the outer layer 13 and the inner layer 14 are of an identical thickness. In a further embodiment, the middle layer 15 is of a thickness that is three times greater than the thickness of the outer layer 13 and the inner layer 14. In a specific embodiment, the outer layer 13 is one foot thick, the middle layer 15 is three feet thick, and the inner layer 14 is one foot thick. As such, the middle layer 15 is of a greater thickness than each of the outer layer 13 and the inner layer 14.

The inner layer 14 is composed of a first buoyant material. The outer layer 13 is composed of a second buoyant material. In one embodiment, the first buoyant material and the second buoyant material are of an identical material. In a specific embodiment, the inner layer 14 and the outer layer 13 are composed of vulcanized rubber. It is contemplated that any suitable rubber or other buoyant and flexible material for the contemplated purpose may be utilized for the inner layer 14 and the outer layer 13. In some embodiments, the outer layer 13 may comprise a tread thereon. As such, a greater friction coefficient is provided between the outer layer 13 and a surface upon which an emergency landing is being made, allowing the plane to stop quickly and safely.

The middle layer 15 is composed of a rigid material. In one embodiment, the middle layer 15 is composed of titanium, as titanium is a resilient metal and a strong metal that will not be deformed, broken or otherwise altered in the event of a heavy impact exerted thereon. It is contemplated that any suitable metal or material for the contemplated purpose may be utilized for the middle layer 15. The outer layer 13, middle layer 15, and inner layer 14 are secured together via any suitable fastener. For example, the outer layer 13, middle layer 15 and inner layer 14 may be secured by a plurality of bolts disposed entirely through the outer layer 13, middle layer 15 and inner layer 14.

Figure 2:
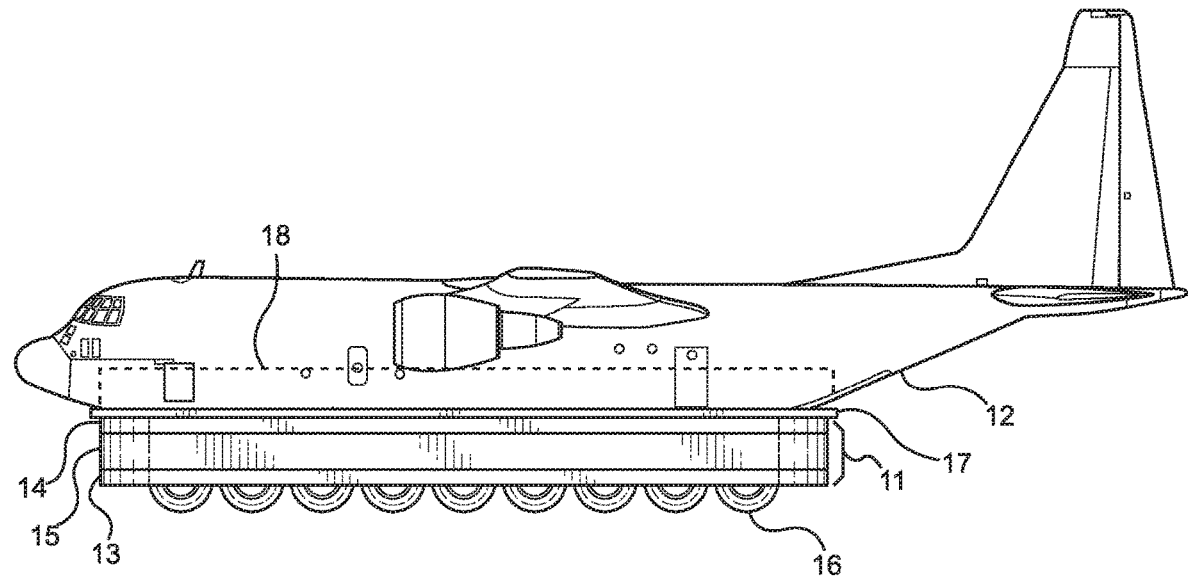
FIG. 2 shows a side elevation view of an embodiment of the deployable aircraft flotation system.
Figure 3:
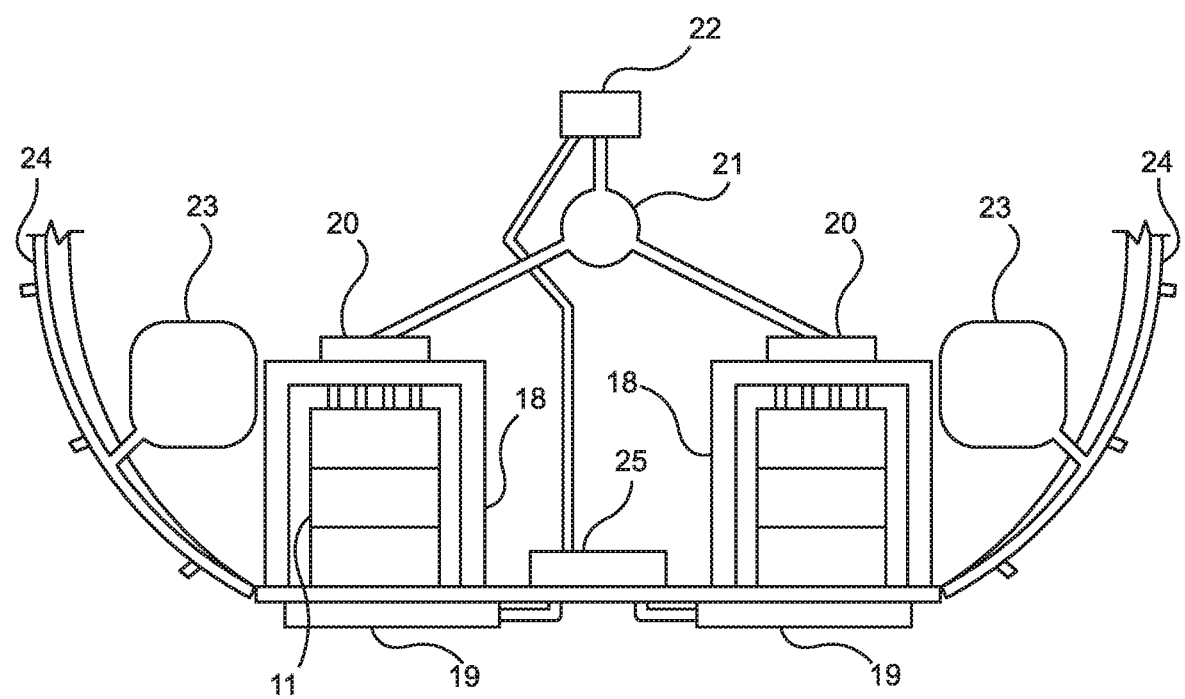
FIG. 3 shows a cross-sectional representative view of an embodiment of the deployable aircraft flotation system in a stowed position.

Referring now to FIG. 2, there is shown a side view of an embodiment of the deployable aircraft flotation system. The deployable aircraft flotation system comprises a pair of flotation members 11 that are movable between a deployed position (as demonstrated in FIGS. 1 and 2) and a stowed position (as demonstrated in FIG. 3). The deployed position, as shown, is defined where each flotation member of the pair of flotation members 11 are disposed on an external surface of a bottom side of an aircraft body 12. As shown in FIG. 3, the stowed position is defined where each flotation member of the pair of flotation members 11 are disposed within a housing 18 that is internally disposed in the aircraft body 12. The pair of flotation members 11 being movable between a deployed position and a stowed position allows for an individual, such as the pilot or other trained crewmember, to activate the pair of flotation members 11 when in an appropriate situation.

In one embodiment, as shown, a plurality of wheels 16 are linearly disposed upon the outer layer of each flotation member of the pair of flotation members 11. The plurality of wheels 16 are configured to assist the aircraft 12 in the event of an emergency landing onto a hard surface. For example, if the aircraft must land in a field or upon a roadway, the plurality of wheels 16 will prevent the aircraft from absorbing too high of an initial impact, thereby preventing or limiting structural damage to the aircraft. In the illustrated embodiment, nine wheels are provided on each flotation member of the pair of flotation members 11, however, it is contemplated that any number of wheels may be utilized to accommodate planes of various sizes and shapes. The plurality of wheels 16 are made of any suitable material, such as vulcanized rubber, for example. Because of the possibility of landing on numerous types of terrains, the plurality of wheels 16 are retractable into the pair of flotation members 12. As such, the user will be able to deploy the plurality of wheels 16 only when they are needed.

In the illustrated embodiment, a platform 17 is disposed on the bottom side of the aircraft body 12. The platform 17 is positioned such that the pair of flotation members 11 will be disposed upon the platform 17 when they are placed into the deployed position. As such, the platform 17 will be able to further absorb impact that is exerted upon the pair of flotation members 11 during an emergency landing. The platform 17 may be of any suitable material for impact absorption, such as titanium. In some embodiments, the platform 17 is integrated upon the bottom surface of the aircraft body 12 on an external surface or an internal surface thereof. As such, the pair of flotation members 11 may be installed upon the platform 17 directly.

Referring now to FIG. 3, there is shown a cross-sectional representative view of an embodiment of the deployable aircraft flotation system in a stowed position. In the illustrated embodiment, the deployable aircraft flotation system comprises an actuator 22. The actuator 22 is configured to engage the elements of the deployable aircraft flotation system when actuated. As such, the actuator 22 is placed in an accessible location for a pilot or crewmember. For example, the actuator 22 may be placed in the cockpit of the aircraft.

The actuator 22, as shown, is in operable connection with a flotation member controller 21 and a bottom restraint controller 25. The flotation member controller 21 is in operable connection with a pair of flotation member lifters 20. The pair of flotation member lifters 20 are mounted upon the housings 18 of the pair of flotation members 11. As such, when the pair of flotation member lifters 20 are actuated via the flotation member controller 21, the pair of flotation members 11 are placed into the deployed position. The pair of flotation member lifters 20 are connected to the pair of flotation members 11 by any suitable configuration. For example, in the illustrated embodiment, the pair of flotation member lifters 20 are connected to the pair of flotation members 11 by a plurality of shafts or a plurality of cables.

Furthermore, the actuator 22 is in operable connection with the bottom restraint controller 25. The bottom restraint controller 25 is in operable connection with a pair of bottom restraints 19. The pair of bottom restraints 19 are placed on the bottom of the housings 18, such that the pair of flotation members 11 are entirely enveloped when in the housings. As such, when the actuator 22 is actuated, the bottom restraint controller 25 will move the pair of bottom restraints, creating a pair of openings in the housings 18, such that the pair of flotation members 11 can extend through the openings. The actuator 22 is in operable connection with both the flotation member controller 21 and the bottom restraint controller 25 such that the flotation member controller 21 and the bottom restraint controller 25 can be simultaneously actuated in the event of an emergency landing.

In some embodiments, the deployable aircraft flotation system further comprises a plurality of sprinklers 24. The plurality of sprinklers 24 are in operable connection with at least one water tank 23. The plurality of sprinklers 24 are disposed on an external surface of the aircraft body such that, in the event of a fire outside of the aircraft, the fire may be put out. In the illustrated embodiment, two water tanks 23 are placed in the interior cavity of the aircraft on each opposing side thereof. As such, water can be equally distributed on both sides of the aircraft.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A deployable aircraft flotation system, comprising:
 a pair of flotation members disposed on a pair of sides of a bottom of an aircraft body;
 each flotation member of the pair of flotation members having an outer layer, an inner layer, and a middle layer disposed between the outer layer and the inner layer;
 the middle layer composed of a rigid material;
 the inner layer composed of a first buoyant material;
 the outer layer composed of a second buoyant material;
 the pair of flotation members being movable from a stowed position to a deployed position;

wherein the stowed position is defined where each flotation member is disposed in a housing;

wherein the deployed position is defined where each flotation member is disposed outside of the housing.

2. The deployable aircraft flotation system of claim 1, wherein the middle layer is composed of titanium.

3. The deployable aircraft flotation system of claim 1, wherein the first buoyant material and the second buoyant material are an identical material.

4. The deployable aircraft flotation system of claim 1, wherein the first buoyant material and the second buoyant material are made of vulcanized rubber.

5. The deployable aircraft flotation system of claim 1, further comprising a plurality of wheels linearly disposed upon the outer layer of each flotation member of the pair of floatation members.

6. The deployable aircraft flotation system of claim 5, wherein the plurality of wheels is retractable between an engaged position and a disengaged position.

7. The deployable aircraft flotation system of claim 1, wherein the outer layer of each floatation member of the pair of floatation members comprises a tread thereon.

8. The deployable aircraft flotation system of claim 1, wherein at least one fastener is configured to secure the outer layer, the middle layer and the inner layer together.

9. The deployable aircraft flotation system of claim 1, further comprising an intermediate flotation member disposed between the pair of flotation members, wherein the intermediate flotation system comprises a middle layer composed of a rigid material, an inner layer composed of a first buoyant material, and an outer layer composed of a second buoyant material.

10. The deployable aircraft flotation system of claim 1, further comprising a plurality of sprinklers disposed on the aircraft body, the plurality of sprinklers in operable connection with at least one water tank.

11. The deployable aircraft flotation system of claim 1, wherein the stowed position is defined where each flotation member is disposed in a housing that is internally disposed in the aircraft body.

12. The deployable aircraft flotation system of claim 1, wherein each flotation member is symmetrically flat.

13. The deployable aircraft flotation system of claim 1, wherein an actuator is configured to move the pair of flotation members from the stowed position to the deployed position.

14. The deployable aircraft flotation system of claim 1, wherein a plurality of cables is configured to move the pair of flotation members from the deployed position to the stowed position.

15. The deployable aircraft flotation system of claim 1, wherein a pair of bottom restraints is in operable connection with the housing, such that the pair of bottom restraints is movable to release the flotation members when in the deployed position.

16. The deployable aircraft flotation system of claim 1, wherein the pair of flotation members are disposed on a platform attached to the bottom of the aircraft body when in the deployed position.

* * * * *